Feb. 18, 1969     H. L. PELTON     3,428,340
HOSE COUPLING
Filed March 20, 1967
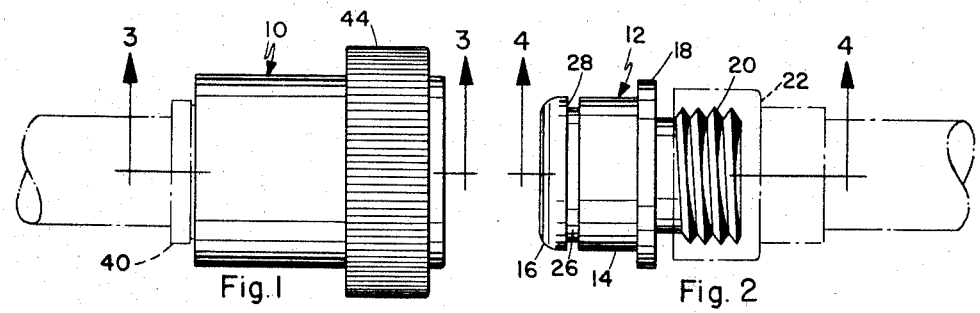
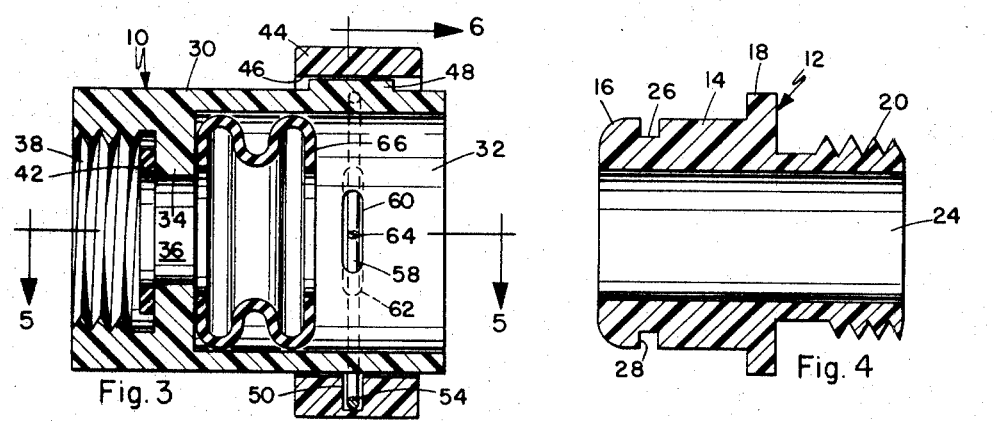
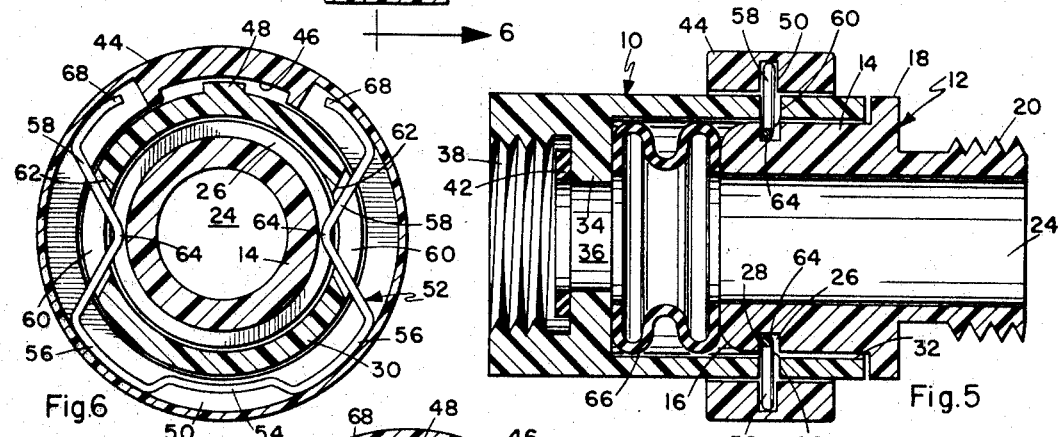
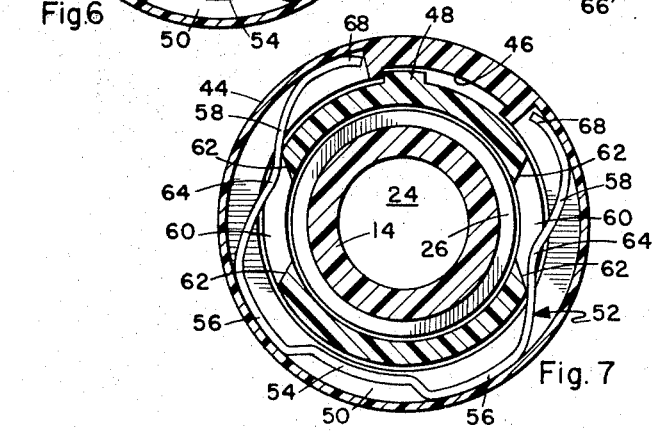
INVENTOR.
HARRY L. PELTON
BY
Knox & Knox United States Patent Office 3,428,340
Patented Feb. 18, 1969

3,428,340
HOSE COUPLING
Harry L. Pelton, 13350 Poway Road,
Poway, Calif. 92064
Filed Mar. 20, 1967, Ser. No. 624,571
U.S. Cl. 285—95                2 Claims
Int. Cl. F16l 17/04, 33/16, 37/24

ABSTRACT OF THE DISCLOSURE

A hose coupling having a socket member which receives a plug member; the members are held together by a resilient wire locking element. A collar is mounted on the socket member for releasing the coupling members. The hose coupling has a completely concealed self-locking mechanism which is releasable by a simple twisting action, yet will not separate in normal use, the connection being sealed by a bellows type seal which is held securely by pressure within the coupling, and the coupling elements being adaptable to conventional hose connectors.

BACKGROUND OF THE INVENTION

The present invention relates to couplings and specifically to a hose coupling which is self-locking and sealing.

Hose couplings of the quick disconnect type usually have pins or lugs on one part to engage and lock into offset slots in the other part. These are normally external and exposed and are subject to distortion or breakage in use. To ensure a good seal in the coupling a gasket is used and considerable force may be necessary to turn and lock the coupling while compressing the gasket.

SUMMARY OF THE INVENTION

The hose coupling described herein is engaged by simply pressing the two parts together, no twisting being necessary. An internal gasket of bellows type seals the joint and fluid pressure in the coupling increases the efficiency of the seal. The locking mechanism is concealed and an external rotatable collar releases the coupling by a slight twisting action requiring a minimum of effort.

BRIEF DESCRIPTION OF THE DRAWINGS

FIGURE 1 is a side elevation view of the socket member of the coupling;

FIGURE 2 is a side elevation view of the plug member;

FIGURE 3 is an enlarged sectional view taken on line 3—3 of FIGURE 1;

FIGURE 4 is an enlarged sectional view taken on line 4—4 of FIGURE 2;

FIGURE 5 is a sectional view taken on line 5—5 of FIGURE 3 and showing the members connected;

FIGURE 6 is a sectional view taken on line 6—6 of FIGURE 3, with the plug member locked in place; and FIGURE 7 is a sectional view similar to FIGURE 6, with the locking means in released position.

Similar characters of reference indicate similar or identical elements and portions throughout the specification and throughout the views of the drawings.

DESCRIPTION OF THE PREFERRED EMBODIMENT

The hose coupling comprises two parts, a socket member 10, which contains the locking means, and a simple one-piece plug member 12. The plug member has a cylindrical plug portion 14 with a smoothly rounded entry end 16 to facilitate insertion into the socket, the other end of the plug portion having a radially projecting flange 18. At the opposite end from plug portion 14 is an externally threaded portion 20 to fit a conventional female hose connector 22, and extending completely through the plug member is an axial bore 24. In the plug portion 14, set back from the entry end 16, is an annular groove 26. The groove is shown as rectangular in cross section, but may be of other configurations as long as the stop wall 28 adjacent entry end 16 is substantially radial or perpendicular to the axis of the plug member for most effective locking action.

Socket member 10 comprises a cylindrical barrel 30 in one end of which is a socket 32 to receive plug member 12 with a reasonably close fit, the socket being deeper axially than the length of plug portion 14. The inner end of socket 32 is defined by a transverse wall 34 in which is a central opening 36, the portion of the barrel on the other side of said wall having an internally threaded bore 38 to receive a conventional male hose connection 40. The latter could also be a threaded faucet or similar element on which the socket member 10 can be mounted, a gasket or washer 42 being inserted in the threaded bore 38 to provide a seal.

Fitted around the barrel 30 adjacent the open end of socket 32 is a concentric collar 44 having an axial slot 46 cut into the inner face thereof, the barrel having a radially projecting stop lug 48 which fits into said slot. The circumferential width of slot 46 is such that the collar 44 has a limited freedom of rotation about stop lug 48, a motion of about 15 degrees on each side of a neutral position being sufficient. Collar 44 has an internal circumferential channel 50 terminating on each side of slot 46 and fitted into the channel is a locking element 52, which is best made from resilient wire or the like. Locking element 52 is somewhat U-shaped and has a central bight portion 54 contained within channel 50 opposite the slot 46. The arms 56 of locking element 52 extend circumferentially around channel 50 and have opposed, inwardly projecting, V-shaped locking lobes 58, which extend through opposed circumferential slots 60 in barrel 30. The ends of each slot 60 diverge outwardly and form inclined ramps 62 conforming generally to the angles of the locking lobe 58. In the neutral position of the collar 44, as in FIGURE 6, the locking lobes 58 seat closely in slots 60 and prevent unnecessary looseness in the collar. The inner apex portions 64 of locking lobes 58 project into socket 32 and seat into the groove 26 when the plug member 12 is fully inserted into the socket. The rounded entry end 16 facilitates insertion of plug member 12 by forcing the locking lobes 58 outwardly, so that they snap back into the groove 26, the radial stop wall 28 preventing any outward urging of the locking lobes when the assembly is under tension.

To ensure a good seal in the assembly a resilient bellows type seal 66 is inserted between the wall 34 and plug member 12, the seal being compressed when the plug member is fully inserted. Internal pressure in the assembly in use will tend to expand the seal 66 and increase the effectiveness thereof.

The ends 68 of locking element arms 56 extend almost to the ends of channel 50, leaving sufficient space for slight circumferential expansion, but close enough to ensure that the locking element will rotate with the collar 44. To release the plug member 12, the barrel 30 is held with one hand, unless it is firmly attached to a faucet or the like, while the collar 44 is rotated. The rotation causes the locking lobes 58 to ride up on the respective ramps 62 and become somewhat flattened out, so that the apex portions 64 are withdrawn from groove 26, as in FIGURE 5. Plug member 12 can then be withdrawn freely. In actual practice the resiliency of the seal 66 pushes the plug member 12 outwardly, at least far enough to push groove 26 out of registration with locking element 52. When collar 44 is released the resiliency of the locking element will cause the locking lobes 58 to return to their normal shape, so that they will ride down ramps 62 and rotate the collar back to its initial position. This makes the collar self-centering or neutralizing, with the locking means returned to the relaxed position ready for engagement with the plug member.

The coupling is thus engaged and locked by simply pushing the plug member into the socket member and is unlocked by a slight rotary motion of the collar. With the locking means concealed inside the coupling, there is little chance of jamming in use due to ingress of foreign matter, and the coupling cannot be unlocked except by rotation of the collar.

It is understood that minor variation from the form of the invention disclosed herein may be made without departure from the spirit and scope of the invention, and that the specification and drawing are to be considered as merely illustrative rather than limiting.

I claim:
1. A hose coupling, comprising:
   a socket member having means for connection to one hose element;
   a plug member having means for connection to another hose element;
   said socket member having a barrel with an axially extending socket in one end thereof;
   a collar mounted for concentric rotation on said barrel;
   said barrel having circumferentially extending slots therein inwardly of said collar;
   a resilient wire having substantially U-shaped locking elements carried by said collar and projecting through said slots into said socket;
   said slots having outwardly divergent ends forming ramps to engage and retract said locking elements upon rotation of said collar relative to said barrel;
   said collar having a pair of inwardly projecting spaced ribs, and stop means on said barrel engageable with said ribs to limit rotation of the collar to the degree necessary to retract said locking elements;
   said plug member having a plug portion shorter than said socket;
   a resilient seal in said socket compressed between said plug portion and the inner end of the socket;
   and said plug portion having an annular groove to receive said locking elements when the plug member is seated in said socket.

2. The structure of claim 1, wherein said resilient seal is a bellows type seal and open ended to permit flow therethrough, the internal pressure during use of the coupling expanding the bellows seal to increase the sealing effectiveness.

References Cited

UNITED STATES PATENTS

| 1,543,356 | 6/1925 | Arnold | 285—321 X |
| 2,356,947 | 8/1944 | Pranger et al. | 277—213 X |
| 2,784,011 | 3/1957 | Roberts | 285—308 |
| 2,805,089 | 9/1957 | Hansen | 285—321 X |
| 3,132,667 | 5/1964 | Baker et al. | 285—308 X |

FOREIGN PATENTS

| 186,079 | 7/1956 | Austria. |
| 1,377,983 | 9/1964 | France. |
| 1,115,540 | 10/1961 | Germany. |

THOMAS F. CALLAGHAN, *Primary Examiner.*

U.S. Cl. X.R.

285—308, 321; 277—213